(12) United States Patent
Jacques et al.

(10) Patent No.: US 10,103,631 B2
(45) Date of Patent: Oct. 16, 2018

(54) POWER CONVERTER CIRCUIT AND METHOD THEREOF

(71) Applicant: REDISEM LTD., Hong Kong (HK)

(72) Inventors: Russell Jacques, Hong Kong (HK); David Coulson, Hong Kong (HK)

( * ) Notice: Subject to any disclaimer, the term of this patent is extended or adjusted under 35 U.S.C. 154(b) by 0 days.

(21) Appl. No.: 15/128,965

(22) PCT Filed: Mar. 24, 2014

(86) PCT No.: PCT/CN2014/073976
§ 371 (c)(1),
(2) Date: Sep. 24, 2016

(87) PCT Pub. No.: WO2015/143612
PCT Pub. Date: Oct. 1, 2015

(65) Prior Publication Data
US 2017/0117806 A1  Apr. 27, 2017

(51) Int. Cl.
*H02M 3/158* (2006.01)
*H05B 33/08* (2006.01)
*H02M 3/155* (2006.01)

(52) U.S. Cl.
CPC ...... *H02M 3/1582* (2013.01); *H05B 33/0809* (2013.01); *H05B 33/0845* (2013.01); *H02M 2003/1552* (2013.01)

(58) Field of Classification Search
CPC ............. H02M 3/158; H02M 3/1582; H02M 3/33507; H02M 2003/1552; H02M 2003/158; H05B 33/0809
See application file for complete search history.

(56) References Cited

U.S. PATENT DOCUMENTS

| | | | |
|---|---|---|---|
| 6,256,209 B1 | 7/2001 | Gurwicz et al. | |
| 7,420,828 B2* | 9/2008 | Ishio | H05B 6/08 219/663 |
| 7,911,463 B2 | 3/2011 | Lin et al. | |
| 8,569,963 B2* | 10/2013 | Walters | H02M 3/1582 315/200 R |

(Continued)

FOREIGN PATENT DOCUMENTS

| | | |
|---|---|---|
| CN | 1710794 A | 12/2005 |
| CN | 1868110 A | 11/2006 |

(Continued)

OTHER PUBLICATIONS

State Intellectual Property Office of People's Republic of China (SIPO), International Search Report, dated Dec. 31, 2014, pp. 1-4, SIPO.

(Continued)

*Primary Examiner* — Matthew Nguyen (57) ABSTRACT

A power converter circuit and an associated method of converting an AC power supply. The power converter circuit comprises: a supply rectifier circuit (2) for rectifying an AC supply power to generate a rectified supply power; an inverter circuit (3) for receiving the rectified supply power to generate an inverted supply power; a load rectifier circuit (4) for rectifying the inverted supply power to generate a rectified load power for supplying a load current to a load (5); and a boost circuit (6) driven by the load current to provide a boosted voltage to the rectified supply power.

18 Claims, 8 Drawing Sheets

(56) References Cited

U.S. PATENT DOCUMENTS

| | | | |
|---|---|---|---|
| 8,796,602 B2* | 8/2014 | Miyauchi | H05B 6/062 |
| | | | 219/620 |
| 2009/0251065 A1 | 10/2009 | Niedermeier et al. | |
| 2012/0170335 A1* | 7/2012 | Lee | H02M 1/4225 |
| | | | 363/89 |
| 2013/0127355 A1 | 5/2013 | Kumar et al. | |
| 2014/0354246 A1* | 12/2014 | Xu | H02M 1/4225 |
| | | | 323/207 |

FOREIGN PATENT DOCUMENTS

| | | | |
|---|---|---|---|
| CN | 101502179 A | 8/2009 |
| CN | 102045925 A | 5/2011 |
| CN | 102907177 A | 1/2013 |
| CN | 102914734 A | 2/2013 |
| JP | 2013252026 A | 12/2013 |
| WO | 9204808 A | 3/1992 |
| WO | 2008152565 A | 12/2008 |
| WO | 2010054454 A | 5/2010 |
| WO | 2010143944 A | 12/2010 |

OTHER PUBLICATIONS

State Intellectual Property Office of People's Republic of China (SIPO), Search Report, dated May 23, 2018, SIPO.

* cited by examiner

POWER CONVERTER CIRCUIT AND METHOD THEREOF

TECHNICAL FIELD

The present invention relates to power converter circuits and methods of converting power, and in particular, circuits and methods of converting AC power to rectified DC power. The present invention is described herein primarily in relation to power converter circuits and methods of converting power suitable for use in power supplies and light emitting diode (LED) drivers, but is not limited to these particular uses.

BACKGROUND ART

Without some means of power factor correction any mains connected equipment which rectifies the incoming AC supply to produce a DC supply will be characterised by low power factor and high harmonic distortion which will generally exceed the permitted limits for mains-connected equipment. Power Supply Units (PSUs) and lighting ballasts which are designed for high efficiency, cost-sensitive consumer applications are often switched-mode types and are frequently based upon the half-bridge or full-bridge topology. These topologies are particularly suitable for higher power, high efficiency applications in which the ratio of input to output voltage is relatively confined. Regulations have been introduced in recent years to constrain the way that the input current is drawn from the AC supply, including the Power Factor (PF), Crest Factor (CF) and Total Harmonic Distortion (THD). The continuing pressure to conform to tighter regulations and reduce manufacturing costs forces the need for innovative methods in the design of switched-mode power supply controllers.

Various passively switched Power Factor Correction (PFC) circuits have been invented which use the switching power waveforms of the power converter to provide a measure of PFC to enable products to meet the statutory regulations at low cost with the disadvantage that the output current through the output load has a high ripple content. However, in many applications it is desirable that the current through the output load is substantially constant with low ripple. For example, in the case of LED lighting, a constant output current with low ripple provides advantages of high efficiency and long life as well as high quality light output without flicker.

Such prior circuits include those disclosed in U.S. Pat. No. 7,911,463B2, US20090251065A1, WO2008152565A2, WO2010054454A2, WO2010143944A1, and WO9204808A1. Although these prior circuits achieve high PF with respect to the way that power is drawn from the mains supply, these circuits are generally not capable of delivering a current to the load which is both regulated and has low ripple.

DISCLOSURE OF INVENTION

Technical Problem

It is an object of the present invention to overcome or ameliorate at least one of the disadvantages of the prior art, or to provide a useful alternative.

Solution to Problem

Technical Solution

The present invention, in a first aspect, provides a power converter circuit comprising:

a supply rectifier circuit for rectifying an AC supply power to generate a rectified supply power;

an inverter circuit for receiving the rectified supply power to generate an inverted supply power;

a load rectifier circuit for rectifying the inverted supply power to generate a rectified load power for supplying a load current to a load; and a boost circuit driven by the load current to provide a boosted voltage to the rectified supply power.

A second aspect of the present invention provides a method of converting an AC supply power, the method comprising:

rectifying the AC supply power to generate a rectified supply power;

inverting the rectified supply power to generate an inverted supply power;

rectifying the inverted supply power to generate a rectified load power for supplying a load current to a load; and using the load current to provide a boosted voltage to the rectified supply power.

Further features of various embodiments of the present invention are defined in the appended claims. It will be appreciated that features may be combined in various combinations in various embodiments of the present invention.

Throughout this specification, including the claims, the words "comprise", "comprising", and other like terms are to be construed in an inclusive sense, that is, in the sense of "including, but not limited to", and not in an exclusive or exhaustive sense, unless explicitly stated otherwise or the context clearly requires otherwise.

BRIEF DESCRIPTION OF DRAWINGS

Description of Drawings

Preferred embodiments in accordance with the best mode of the present invention will now be described, by way of example only, with reference to the accompanying figures, in which.

MODE FOR THE INVENTION

Mode for Invention

Referring to the figures, embodiments of the present invention provide a power converter circuit 1 comprising a supply rectifier circuit 2 for rectifying an AC supply power to generate a rectified supply power. The power converter circuit 1 further comprises an inverter circuit 3 for receiving the rectified supply power to generate an inverted supply power. The power converter circuit 1 also comprises a load rectifier circuit 4 for rectifying the inverted supply power to generate a rectified load power for supplying a load current to a load 5. A boost circuit 6 is driven by the load current to provide a boosted voltage to the rectified supply power. The AC supply power can be provided by an AC power source 7 such as a mains power supply.

Typically, the waveforms of the rectified supply power have peaks and troughs. By using the boost circuit 6 to provide a boosted voltage to the rectified supply power the resulting waveforms are smoother with smaller peaks and troughs. The resulting waveforms are the sum of the rectified supply power waveforms before boosting and the waveforms of the boosted voltage. In the power converter circuit 1 described above, substantially all of the load current is used by the boost circuit 6 to provide the boosted voltage. Accordingly, the power converter circuit 1 achieves good Power Factor, low Total Harmonic Distortion, tight regulation of load current or voltage and low ripple in the load current or voltage.

The power converter circuit 1 also comprises a sensing circuit 8. An input of the sensing circuit 8 is connected to an input of the load rectifier circuit 4 and an output of the sensing circuit 8 is connected with an input of the boost circuit 6. In the present embodiment, the sensing circuit 8 comprises a current-sensing device. This is suited for use with loads such as LEDs. In particular, the current-sensing device can take the form of a resistive component or resistor R1. In other embodiments, the sensing circuit 8 can comprise a voltage-sensing device. This is suited to applications where the power converter circuit is part of a power supply or power converter providing a voltage source for a load.

The power converter circuit 1 comprises a controller 9. The inverter circuit 3 has one or more switches and the controller controls the switches. In the embodiments shown in the figures, the inverter circuit 3 is a series-resonant half-bridge inverter with two switches S1 and S2. An input 10 of the controller 9 is connected to an input of the load rectifier circuit 4. Another input 11 of the controller 9 is connected to an output of the sensing circuit 8.

Figure 2:
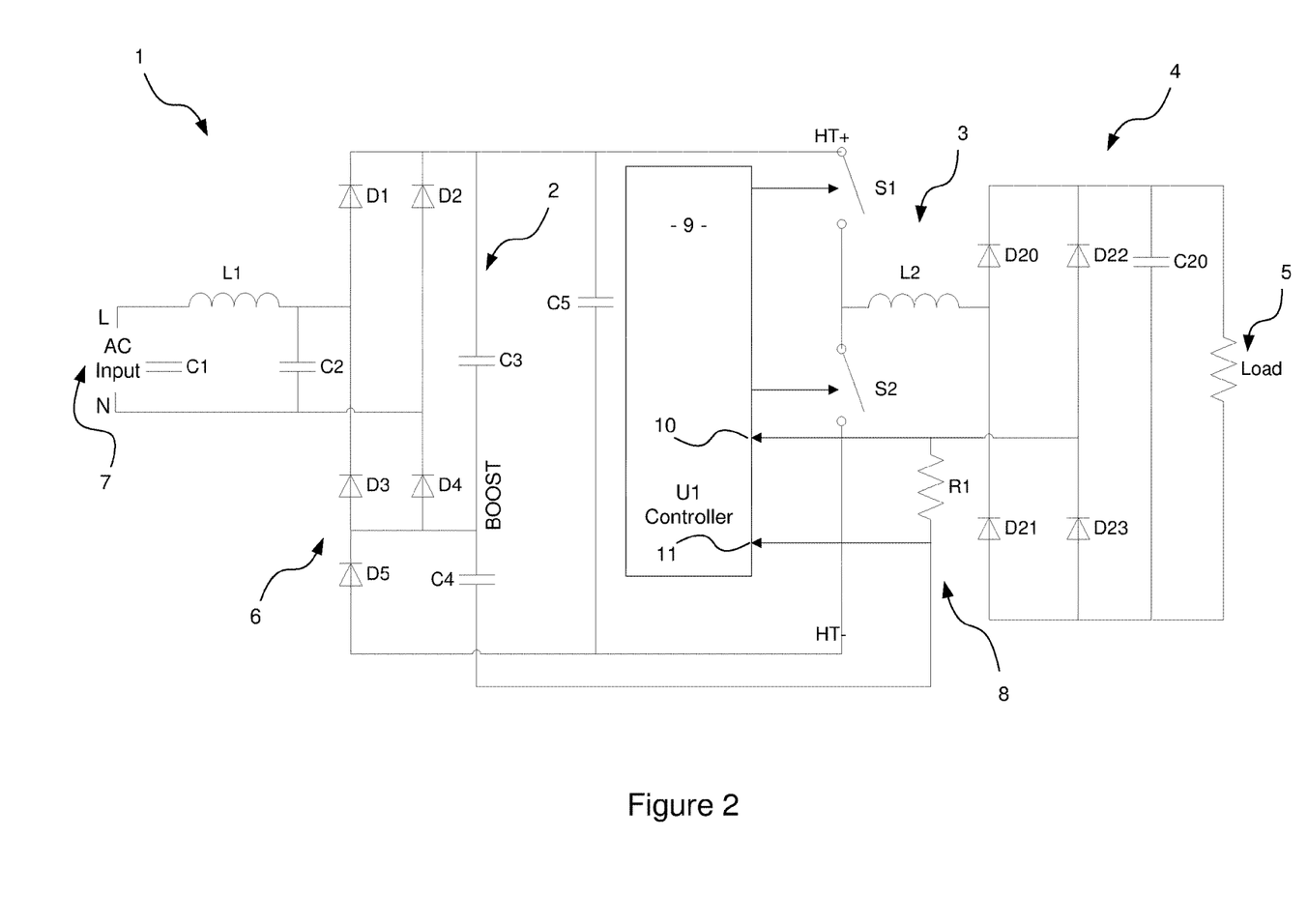
FIG. 2 is a schematic diagram of a power converter circuit in accordance with an embodiment of the present invention.

In one embodiment, as best shown in FIG. 2, the boost circuit 6 comprises a first capacitor C3 connected across the supply rectifier circuit 2. A second capacitor C4 is connected between the supply rectifier circuit 2 and an output of the sensing circuit 8. A diode D5 is connected between the supply rectifier circuit 2 and the inverter circuit 3. An input capacitor C2 is connected across an input of the supply rectifier circuit 2.

Figure 3:
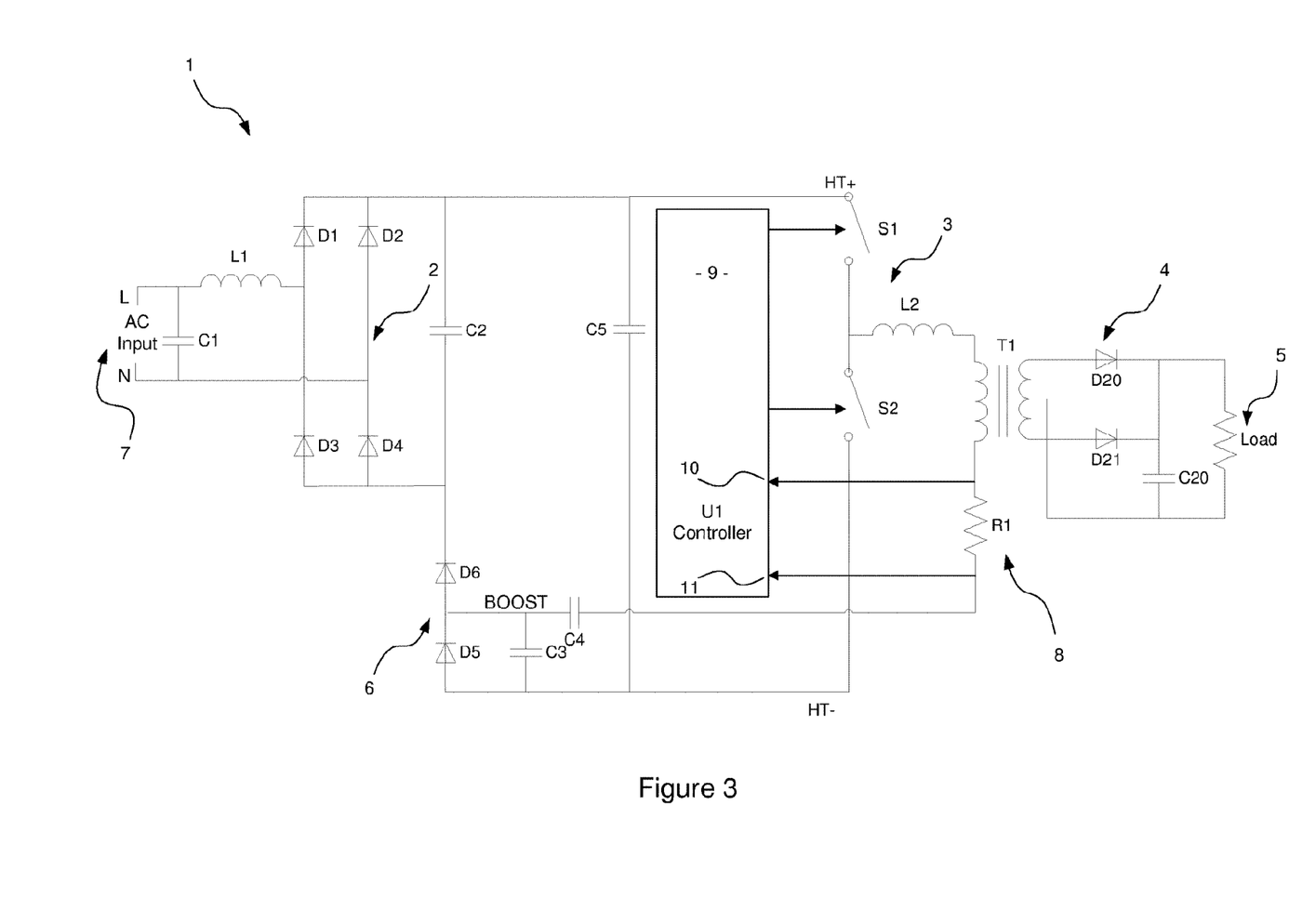
FIG. 3 is a schematic diagram of a power converter circuit in accordance with another embodiment of the present invention.

In another embodiment, as best shown in FIG. 3, the boost circuit 6 comprises a first capacitor C3 connected between the inverter circuit 3 and a connection point A. A second capacitor C4 is connected between an output of the sensing circuit 8 and the connection point A. A first diode D5 is connected in parallel with the first capacitor C3 and between the inverter circuit 3 and the connection point A, with the first diode forward-biased towards the connection point A. A second diode D6 is connected between the connection point A and the supply rectifier circuit 2, with the second diode forward-biased towards the supply rectifier circuit. An input capacitor C2 is connected across an output of the supply rectifier circuit 2.

Figure 4:
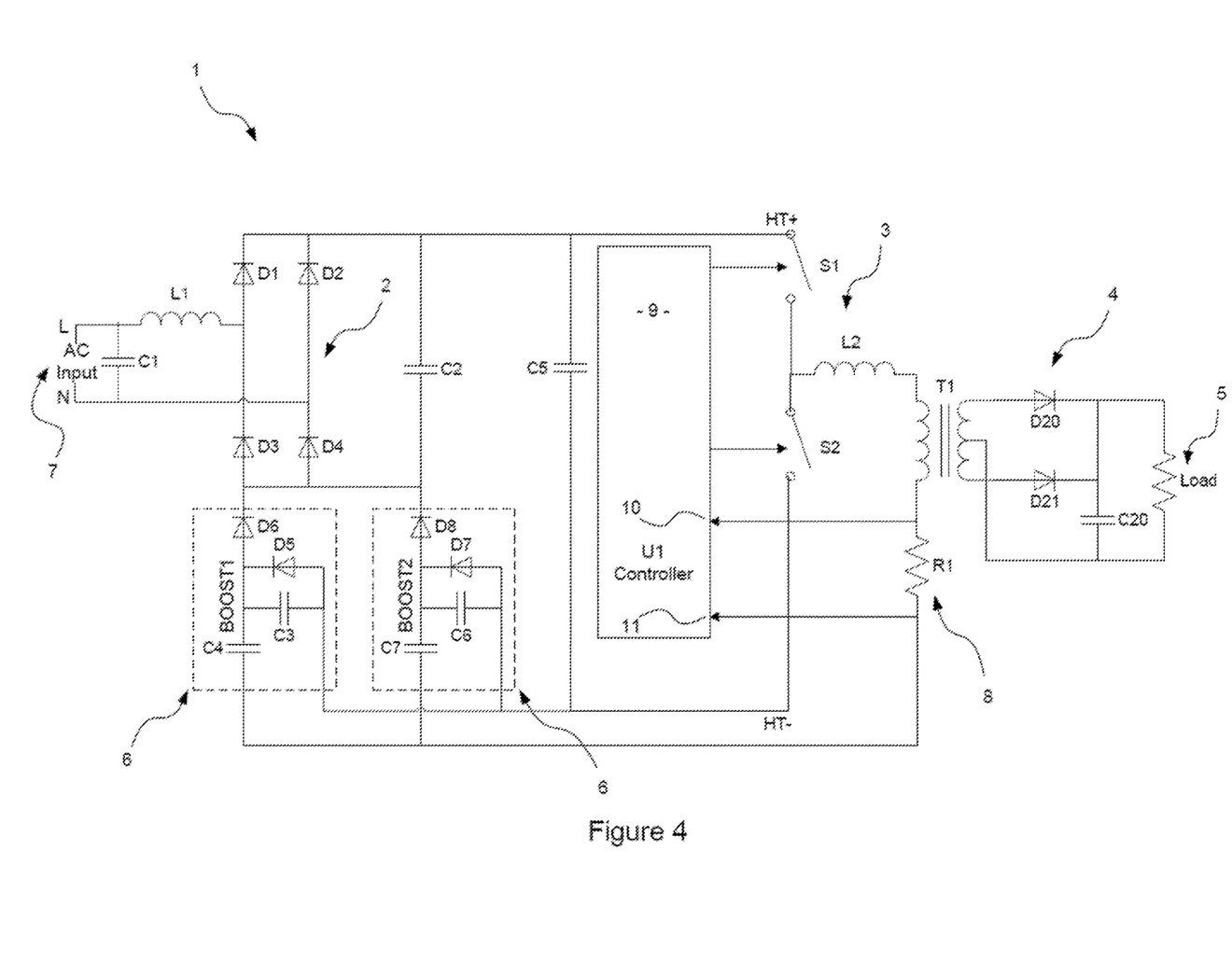
FIG. 4 is a schematic diagram of a power converter circuit in accordance with a further embodiment of the present invention.

In other embodiments, the power converter circuit 1 comprises two or more of said boost circuits 6. For example, FIG. 4 shows a power converter circuit 1 with two of the boost circuits 6 shown in FIG. 3. In the two boost circuits 6, C6 is equivalent to C3, C7 is equivalent to C4, D7 is equivalent to D5, and D8 is equivalent to D6. Having more boost circuits 6 provides even more improved performance such as better Power Factor, lower Total Harmonic Distortion, tighter regulation of load current or voltage and lower ripple in the load current or voltage.

The power converter circuit 1 comprises a first supply line L and a second supply line N to receive the AC supply power from the AC power source 7. The first supply line L is connected to a first input of the supply rectifier circuit 2 and the second supply line N connected to a second input of the supply rectifier circuit 2. A supply capacitor C1 is connected between the first and second supply lines across the AC power source 7. A supply inductor L1 is connected in series with the first supply line L between the supply capacitor C1 and the first input of the supply rectifier circuit 2. A bulk capacitor C5 is connected across an input of the inverter circuit 3.

In the present embodiments, the supply rectifier circuit 2 comprises a full-bridge rectifier with four diodes D1, D2, D3, and D4. In other embodiments, however, the supply rectifier circuit 2 can have other configurations. For example, the supply rectifier circuit 2 can comprise a half-bridge rectifier. In this case, however, most of the power converter circuit would need to be mirrored. In particular, in one embodiment, and using FIG. 3 as a reference, C5 would be split into two parts with the N input connected to the middle of the new split C5. D2 and D4 would be deleted. D5, D6, C3, C4 would be added to the HT+ side, in the same manner as they are connected to the negative HT− side.

The inverter circuit 3 comprises two switches S1 and S2 connected in series. The inverter circuit 3 further comprises an inverter inductor L2 having an inverter inductor input connected between the two switches.

In one embodiment, as best shown in FIG. 2, the inverter inductor L2 has an inverter inductor output connected to the load rectifier circuit 4. The load rectifier circuit in this embodiment comprises a full bridge rectifier with four diodes D20, D21, D22, and D23.

In other embodiments, as best shown in FIGS. 3 and 4, the inverter inductor L2 has an inverter inductor output connected to a first side of a transformer T1, and the load rectifier circuit 4 is connected to a second side of the transformer T1. In this way, the load is isolated from the AC power source 7. The load rectifier circuit 4 in these embodiments comprises two diodes D20 and D21.

It is appreciated by those skilled in the art that there are different variations of the circuit within the scope of the present invention. The circuit components shown in the embodiments can be placed in different arrangements or order, but still fall within the scope of the present invention and provide the functionality described in respect of the circuit as originally arranged or ordered in the described embodiments. For example, in the embodiments shown in FIGS. 3 and 4, the inverter inductor L2, the transformer T1, and the resistor R1 are connected in series. It is appreciated by those skilled in the art that these components can be interchanged freely whilst still providing the same functionality as the components provided before being interchanged, and therefore, still falling within the scope of the present invention.

Thus, some preferred embodiments of the present invention generally provide a power converter circuit with a series-resonant half-bridge inverter, one or more passive boost circuits and a controller which corrects the PF and minimises the harmonic distortion of the input current.

The resonant tank is made up of an inductor and the series combination of the capacitors in the passive boost circuits. The Q factor of the resonant tank determines in part the switching frequency variation that must be utilised by the controller to achieve the necessary levels of PF and harmonic distortion across the required ranges of the AC supply power, such as mains supply input, and the output load.

In one embodiment, the passive boost circuit is made up of two diodes and at least one capacitor. A high proportion, if not substantially all, of the current flowing through the resonant tank of the series-resonant inverter is coupled through the capacitor into the passive boost circuit wherein the current flows through one of the two diodes, depending on the polarity of the current at any moment in time. During one half-cycle of the inverter one diode conducts so that energy is delivered from the mains supply to the said resonant tank. During the second half-cycle the other diode conducts so that energy is delivered from the resonant tank to the bulk capacitor. An optional second capacitor may be used to modify the conduction times of the two diodes thereby making the boosting action dependent on the frequency and the potential difference across the two diodes.

A supply filter comprising reactive components (L1, C1) is coupled between the mains terminals (L, N) and the bridge supply rectifier circuit 2 to suppress unwanted emissions relating to the inverter switching frequency.

In a preferred topology of the invention the half-bridge circuit drives a series-connected combination of the resonant inductor, the output load and the passive boost circuit. In this way, the controller can regulate the output current accurately by sensing and regulating the current through the resonant tank. Therefore, there is no need for remote sensing using such devices as optocouplers, which is a particular advantage when driving isolated loads. Additionally there is no need for an additional resonant current loop to provide the boosting function because the load current itself drives the passive boost circuit thereby achieving the advantages of the present invention with minimal power wastage and complexity.

For example, for typical LED lighting applications, with a single line input and an output voltage range varying up to 30% from nominal, the present invention can achieve PF>0.95 and compliant harmonic emissions with THD<20% with only a single passive boost circuit. In this case, the burden of adding PF correction and low harmonic emissions is simply the cost of three inexpensive passive components (C3, C4, D5).

The present invention can also employ a plurality of passive boost circuits operating in parallel to achieve good PF and low harmonic distortion across a wider range of input and output voltages than may be achieved with the single passive boosting stage. For example, a typical LED lighting application required to operate with dual line input (220V/240V) and an output voltage range of 50-100%, can achieve PF>0.95 and compliant harmonic emissions with THD<20% if using two passive boosting stages are employed.

Figure 1:
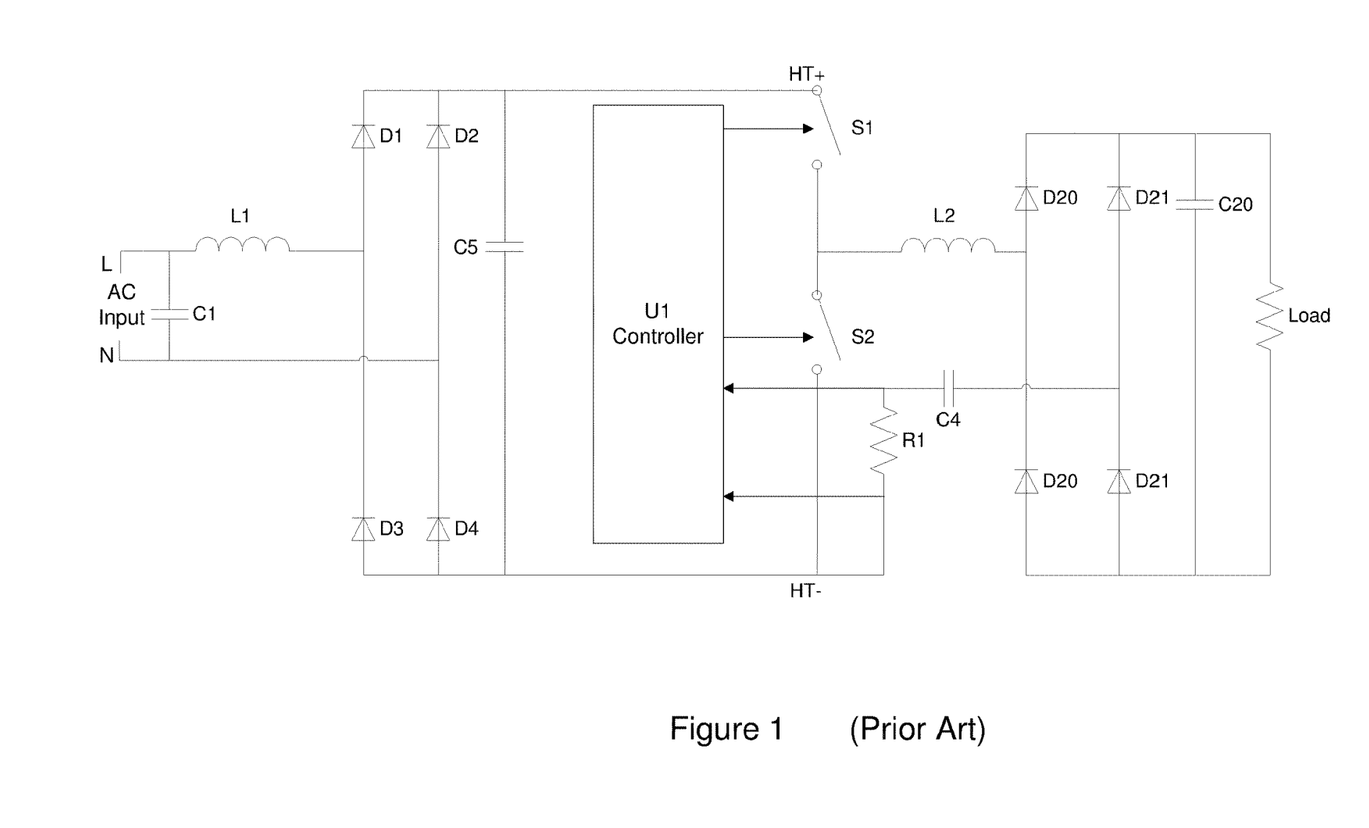
FIG. 1 is a schematic diagram of a prior art power converter circuit.

Considering the figures more specifically, FIG. 1 shows a typical non-isolating half-bridge driver circuit without any Power Factor Correction for supplying regulated power to an output load. FIG. 2 shows an exemplary embodiment according to the present invention. By comparison it can be seen that the only difference between the two circuits is the addition of three passive components C2, C3 and D5.

Referring to FIG. 2, a mains voltage source (L, N) is connected to a low-pass input filter comprising C1, L1, C2. Typically, the low-pass input frequency bandwidth would be below the switching frequency of the power converter, but above the mains voltage supply frequency. The output of the filter is connected to the input of the full-wave rectifier bridge (D1, D2, D3, and D4). A passive boost circuit (D5, C3, C4) takes power from its input (via C4) to produce a boosted voltage on the DC bulk capacitor C5. A controller 9 (U1) drives the half-bridge switches S1 and S2 alternately to produce an alternating voltage at a first connection of a resonant inductor L2 with the second connection being coupled to a first input connection of a rectifier (D20, D21, D22, and D23). The first and second output connections of the rectifier (D20, D21, D22, and D23) are coupled to an output storage device C20 and the output load. The second input connection of the rectifier (D20, D21, D22, and D23) is connected to a first connection of a current-sensing device R1 with the second connection being connected to a first connection of boost circuit 6 (C3, C4, D5). A second connection of the boost circuit 6 (C3, C4, D5) is connected to one output connection of the bridge rectifier (D1, D2, D3, D4) and a third connection of the boost circuit 6 (D3, C4, D4) being connected to the second output connection of the bridge rectifier (D1, D2, D3, D4).

It can be seen that the current through the output load also flows through R1, via the full-bridge output rectifiers D20, D21, D22, and D23, so it is practical to achieve highly accurate DC current with very low ripple.

FIG. 3 gives an alternative an embodiment of the present invention configured for an isolated output and shows capacitor C3 in a different position. As an additional permutation example, input (boost) capacitor C2 may be located after the rectifier bridge (D1, D2, D3, D4), provided that the additional diode D6 is included to provide the necessary boosting function.

FIG. 4 shows a possible extension of the present invention where the application requirement is for a wider voltage range on the mains input or the output load. Here, the limitations of the power converter circuit described in FIGS. 2 and 3 can be eased by adding a second boost circuit 6, operating in parallel with the first boost circuit 6. The second boost circuit (comprising C6, C7, D7 and D8) has different component values and therefore operates with different characteristics to the first boost stage (comprising C3, C4, D5 and D6).

Figure 5:
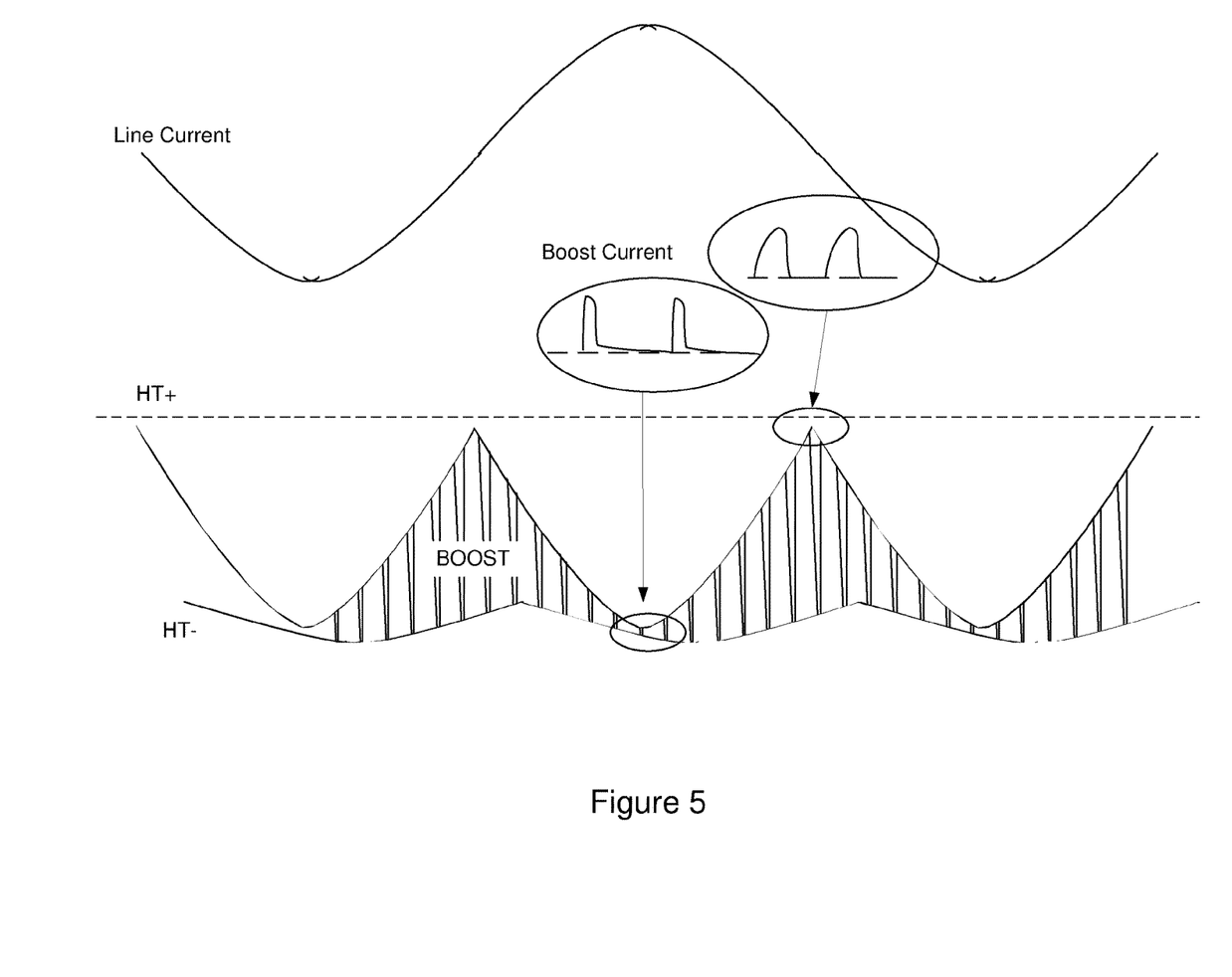
FIG. 5 shows typical waveforms for the power converter circuit shown in FIG. 2 or FIG. 3, when running optimally.

FIG. 5 shows the current and voltage waveforms when the circuit is working optimally. The same current that passes through the load also flows through the passive boost circuit 6 (formed by C2, C3 and D5), which produces a voltage on the bulk capacitor C5. Here, the voltage developed across the boost capacitor C3 is large enough to force the boost diode D5 to conduct for part of each switching cycle, throughout the entire cycle of the line supply waveform. When the line voltage is at the zero-crossing, the conduction through D5 is almost, but not quite cut off, so that the current drawn from the supply is at a maximum. Consequently, the boosting at this point is almost non-existent. However, around the peak of the line voltage, the conduction of D5 is at a maximum, approximately 50%, thus minimising the power drawn from the line supply.

Figure 6:
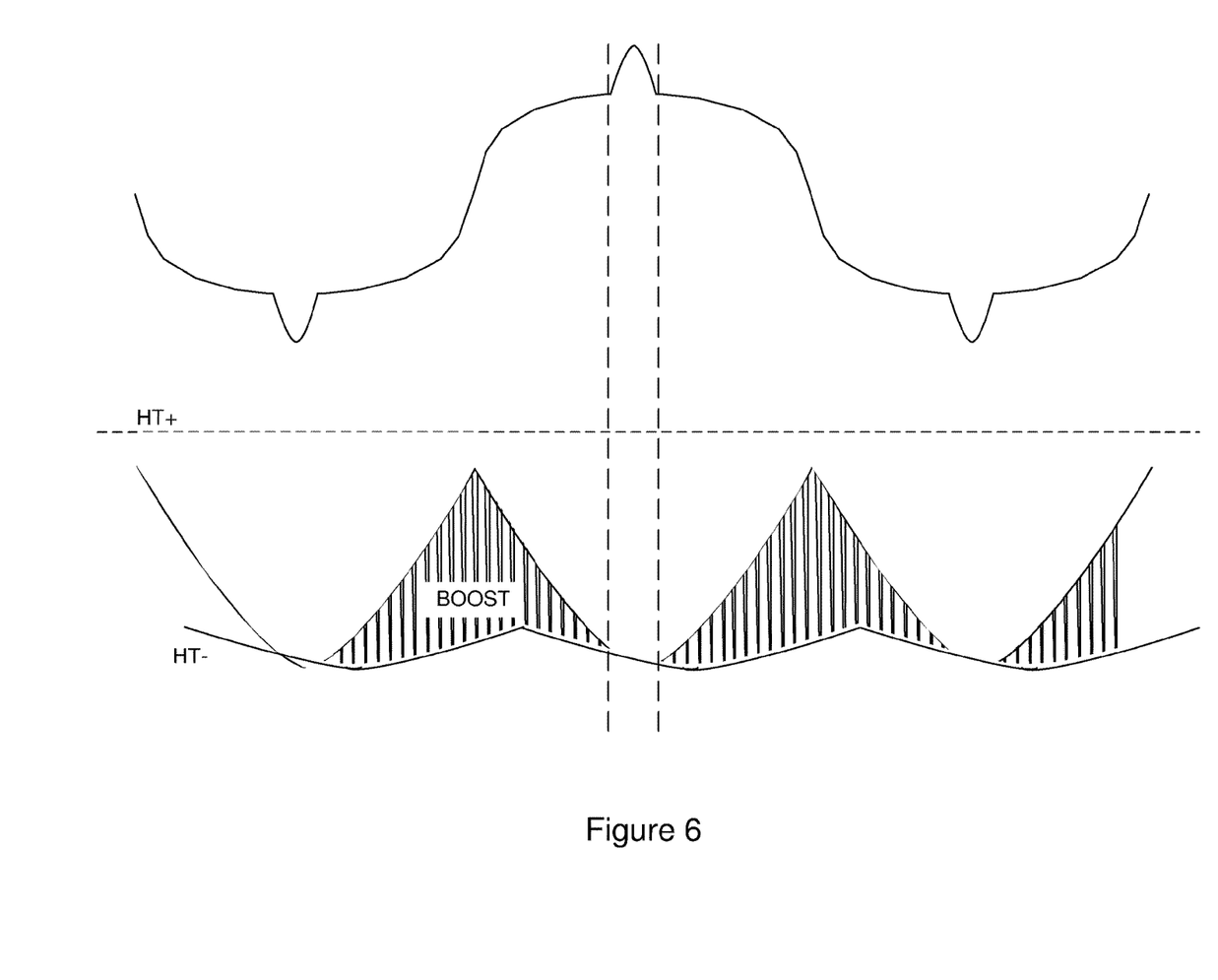
FIG. 6 shows typical waveforms for the power converter circuit shown in FIG. 2 or FIG. 3, when running sub-optimally, with low mains supply and/or high output LED voltage.

FIG. 6 shows the current and voltage waveforms that occur if the input voltage is decreased (assuming that the controller maintains the output voltage and current at substantially the same levels). The reduced input voltage results in a lower average voltage and increased ripple across the DC bulk capacitor C5. The control circuit decreases the switching frequency to maintain the load current regulation, increasing the current passed through the boost diode D5, which partly compensates the bulk supply voltage. However, the lower bulk supply voltage and increased ripple means that the bulk voltage falls below the rectified mains voltage when the mains voltage is at the peak. At this point, the bridge rectifiers D1, D2, D3, and D4 turn on fully, superimposing a sharp pulse on to the current waveform. The mains current waveform is now rich in harmonics, making it less likely to comply with the statutory requirements of the harmonics emissions standards.

Figure 7:
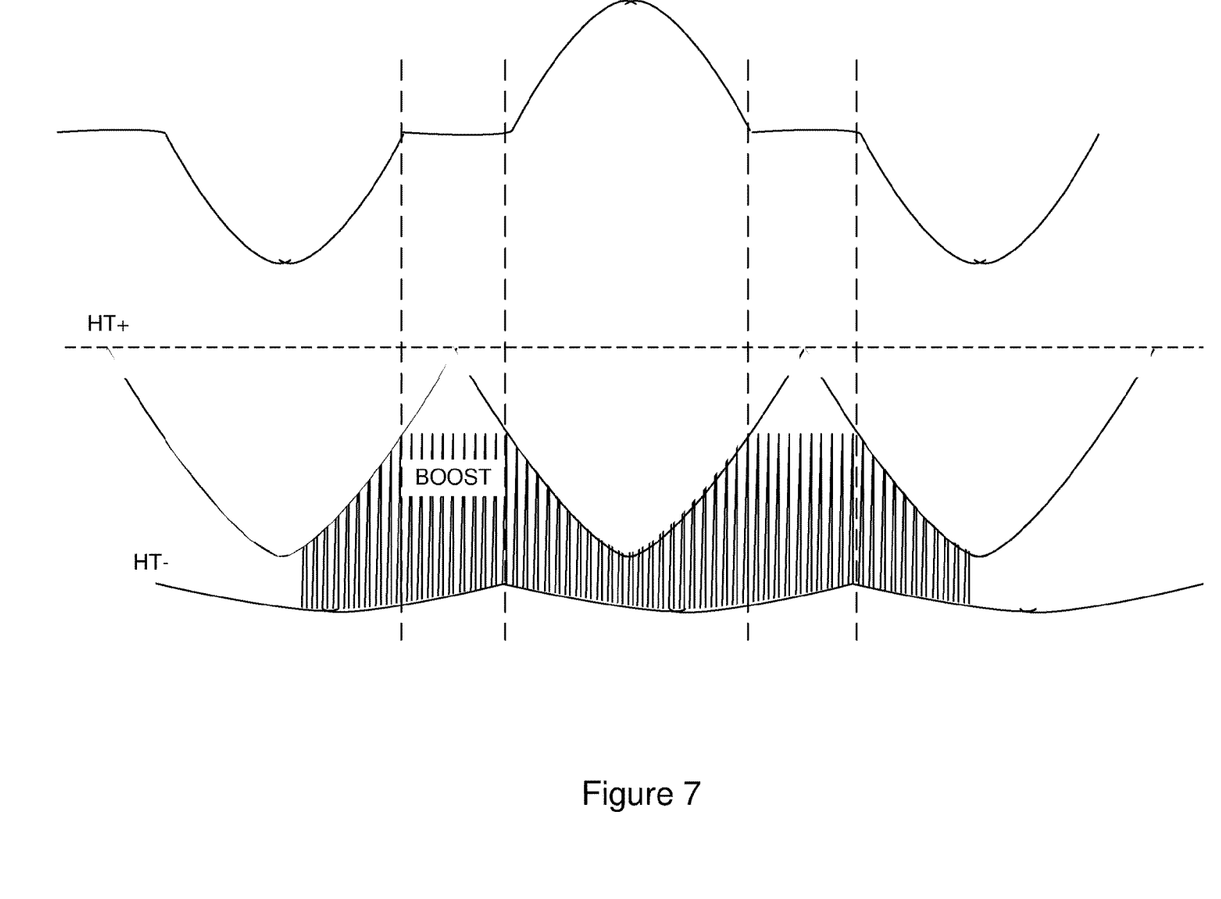
FIG. 7 shows typical waveforms for the power converter circuit shown in FIG. 2 or FIG. 3, when running sub-optimally, with high mains supply and/or low output LED voltage.

FIG. 7 shows the converse set of voltage and current waveforms that occur if the input voltage is increased (again assuming that the controller maintains the output voltage and current at substantially the same levels). As in the previous case, the distorted line current waveform is rich in harmonics, making it less likely to comply with harmonics emissions standards.

Figure 8:
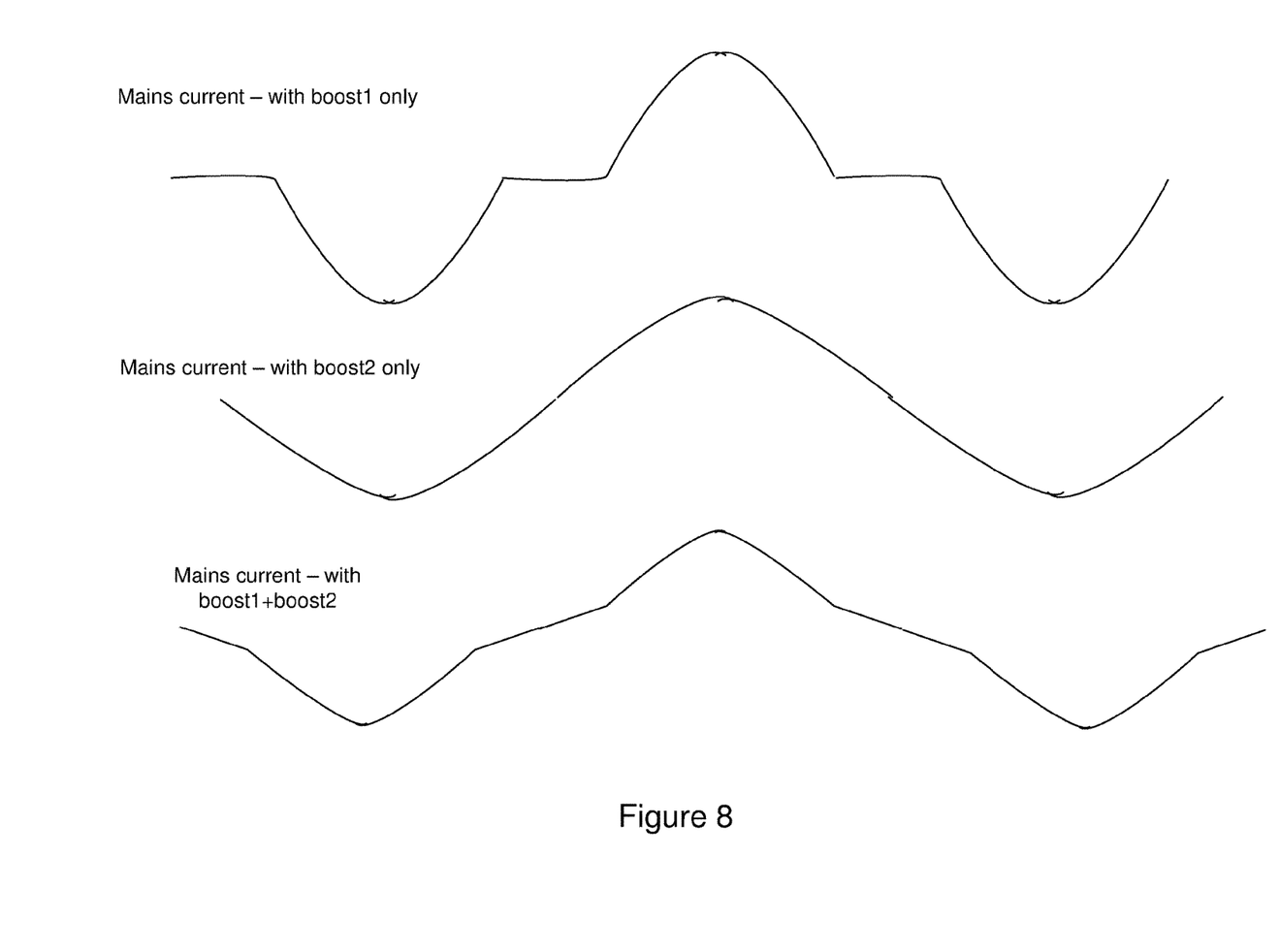
FIG. 8 shows the typical waveforms achieved by the first and second boost circuits for the power converter circuit shown in FIG. 4, showing the separate PFC contributions of the two boost circuits, when running sub-optimally, with high mains supply and/or low output LED voltage.

FIG. 8 shows how the poor current waveform of FIG. 7 can be improved by adding a proportion of the waveform in FIG. 5 by using two passive boost circuits in parallel, as shown in FIG. 4. In this way, using two or more passive boost circuits can improve the PF and reduce harmonic distortion under these conditions.

The present invention, in another aspect, also provides a method of converting an AC supply power. In a preferred embodiment, the method comprises rectifying the AC supply power to generate a rectified supply power, inverting the rectified supply power to generate an inverted supply power, rectifying the inverted supply power to generate a rectified load power for supplying a load current to a load, and using the load current to provide a boosted voltage to the rectified supply power.

Other features of preferred embodiments of this method have been described above or are readily apparent from the above description.

The present invention achieves good Power Factor, low Total Harmonic Distortion, tight regulation of load current or voltage and low ripple in the load current or voltage. Furthermore, since only passive components are used, these advantages are provided at minimum cost.

Generally, the present invention provides power converter circuits and methods for converting power to supply a regulated or substantially constant DC current or voltage to a load using a passive boosting technique to achieve an input current with high power factor, an output current or voltage with low ripple, and low harmonic distortion. More specifically, the present invention is suitable for use in power supplies such as Switched-Mode Power Converters (SMPC), including Switched Mode Power Supplies (SMPS), Inverters, Lighting Ballasts, and flicker-free Light-Emitting Diode (LED) drivers. In particular, the present invention advantageously provides apparatus and methods for controlling the power factors of AC-DC Power Converters. The present invention is particularly suited for use in resonant-mode Switched-Mode Power Converters.

It can be appreciated that the aforesaid embodiments are only exemplary embodiments adopted to describe the principles of the present invention, and the present invention is not merely limited thereto. Various variants and modifications may be made by those of ordinary skill in the art without departing from the spirit and essence of the present invention, and these variants and modifications are also covered within the scope of the present invention. Accordingly, although the invention has been described with reference to specific examples, it can be appreciated by those skilled in the art that the invention can be embodied in many other forms. It can also be appreciated by those skilled in the art that the features of the various examples described can be combined in other combinations. In particular, there are many possible permutations of the circuit arrangements described above which use the same passive method to achieve passive power factor correction, and which will be obvious to those skilled in the art.

The invention claimed is:

1. A single-stage power converter circuit comprising:
   a supply rectifier circuit for rectifying an AC supply power to generate a rectified supply power;
   an inverter circuit for receiving the rectified supply power to generate an inverted supply power;
   a load rectifier circuit for rectifying the inverted supply power to generate a rectified load power for supplying a load current to a load; and
   a passive boost circuit driven by the load current to provide a boosted voltage to the rectified supply power.

2. A single-stage power converter circuit according to claim 1 comprising a sensing circuit, wherein an input of the sensing circuit is connected to an input of the load rectifier circuit and an output of the sensing circuit is connected with an input of the passive boost circuit.

3. A single-stage power converter circuit according to claim 2 wherein the sensing circuit comprises a current-sensing device.

4. A single-stage power converter circuit according to claim 2 wherein the sensing circuit comprises a voltage-sensing device.

5. A single-stage power converter circuit according to claim 2 comprising a controller, wherein the inverter circuit has one or more switches and the controller controls the switches.

6. A single-stage power converter circuit according to claim 5 wherein an input of the controller is connected to an input of the load rectifier circuit.

7. A single-stage power converter circuit according to claim 5 wherein an input of the controller is connected to an output of the sensing circuit.

8. A single-stage power converter circuit according to claim 1 wherein the passive boost circuit comprises a first capacitor connected across the supply rectifier circuit, a second capacitor connected between the supply rectifier circuit and an output of the sensing circuit, and a diode connected between the supply rectifier circuit and the inverter circuit.

9. A single-stage power converter circuit according to claim 8 comprising an input capacitor connected across an input of the supply rectifier circuit.

10. A single-stage power converter circuit according to claim 1 wherein the passive boost circuit comprises a first capacitor connected between the inverter circuit and a connection point, a second capacitor connected between an output of the sensing circuit and the connection point, a first diode connected in parallel with the first capacitor and between the inverter circuit and the connection point with the first diode forward-biased towards the connection point, and a second diode connected between the connection point and the supply rectifier circuit with the second diode forward-biased towards the supply rectifier circuit.

11. A single-stage power converter circuit according to claim 10 comprising an input capacitor connected across an output of the supply rectifier circuit.

12. A single-stage power converter circuit according to claim 1 comprising two or more of said passive boost circuits.

13. A single-stage power converter circuit according to claim 1 comprising a first supply line and a second supply line to receive the AC supply power from an AC power source, the first supply line connected to a first input of the supply rectifier circuit and the second supply line connected to a second input of the supply rectifier circuit, a supply capacitor connected between the first and second supply lines across the AC power source, and a supply inductor connected in series with the first supply line between the supply capacitor and the first input of the supply rectifier circuit.

14. A single-stage power converter circuit according to claim 1 comprising a bulk capacitor connected across an input of the inverter circuit.

15. A single-stage power converter circuit according to claim 1 wherein the inverter circuit comprises two switches connected in series, and an inverter inductor having an inverter inductor input connected between the two switches.

16. A single-stage power converter circuit according to claim 15 wherein the inverter inductor has an inverter inductor output connected to the load rectifier circuit.

17. A single-stage power converter circuit according to claim 15 wherein the inverter inductor has an inverter inductor output connected to a first side of a transformer, the load rectifier circuit connected to a second side of the transformer.

18. A method of converting an AC supply power in a single-stage power converter, the method comprising:
rectifying the AC supply power to generate a rectified supply power;
inverting the rectified supply power to generate an inverted supply power;
rectifying the inverted supply power to generate a rectified load power for supplying a load current to a load; and
using the load current to provide a boosted voltage to the rectified supply power through a passive circuit.

* * * * *